US008006017B2

(12) United States Patent
Futral et al.

(10) Patent No.: US 8,006,017 B2

(45) Date of Patent: Aug. 23, 2011

(54) STREAM PRIORITY

(75) Inventors: William T. Futral, Portland, OR (US); Kenneth C. Creta, Gig Harbor, WA (US); Sujoy Sen, Portland, OR (US); Gregory D. Cummings, Portland, OR (US); Sivakumar Radhakrishnan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 74 days.

(21) Appl. No.: 11/020,500

(22) Filed: Dec. 21, 2004

(65) Prior Publication Data

US 2006/0136639 A1 Jun. 22, 2006

(51) Int. Cl.
*G06F 13/14* (2006.01)
*G06F 13/38* (2006.01)

(52) U.S. Cl. ........................................ 710/244; 710/305

(58) Field of Classification Search .................. 710/244, 710/305, 306, 309, 313

See application file for complete search history.

(56) References Cited

U.S. PATENT DOCUMENTS

| | | | | |
|---|---|---|---|---|
| 6,163,541 | A * | 12/2000 | Casey et al. | 370/395.51 |
| 6,442,631 | B1 * | 8/2002 | Neufeld et al. | 710/107 |
| 6,546,439 | B1 * | 4/2003 | Strongin et al. | 710/52 |
| 6,801,970 | B2 * | 10/2004 | Riley et al. | 710/105 |
| 7,283,468 | B1 * | 10/2007 | Hill et al. | 370/229 |
| 2003/0217219 | A1 * | 11/2003 | Sharma et al. | 710/311 |

OTHER PUBLICATIONS

PCI Express Base Specification, Revision 1.0a, Apr. 15, 2003, pp. 27, 28, 58, 95-100.*

"Core logic", Glossary-CNET.com, p. 1.*

* cited by examiner

*Primary Examiner* — Mark Rinehart
*Assistant Examiner* — Trisha Vu
(74) *Attorney, Agent, or Firm* — Caven & Aghevli LLC

(57) ABSTRACT

A system, method and apparatus for prioritizing transactions is disclosed. I/O devices may generate transactions with a stream identifier. A transaction classifier may assign a priority to a transaction based upon a stream identifier of the transaction. An arbiter may select a transaction for processing based upon priorities assigned to the transaction.

22 Claims, 5 Drawing Sheets

STREAM PRIORITY

BACKGROUND

Input-output (I/O) devices connected to a data bus follow specific transaction ordering rules. For example, a computer I/O hub connected to a peripheral component interface (PCI) bus preserves an order of the transactions received from an I/O controller through the PCI bus. The I/O hub implements an I/O interface using modified first-in-first-out (FIFO) queues to store the transactions received from the I/O devices in an order that obey PCI ordering rules.

When an I/O controller initiates an ordered sequence of transactions, the I/O hub stores the transactions in the modified FIFO queues and executes the transactions in the order received. A transaction, which comes after earlier transactions, can not be executed until the earlier transactions are executed. Thus, if one transaction is stalled all the remaining transactions will be stalled.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

In the following detailed description, numerous specific details are described in order to provide a thorough understanding of the invention. However the present invention may be practiced without these specific details. In other stances, well known methods, procedures, components and circuits have not been described in detail so as not to obscure the present invention. Further, example sizes/models/values/ranges may be given, although the present invention is not limited to these specific examples.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
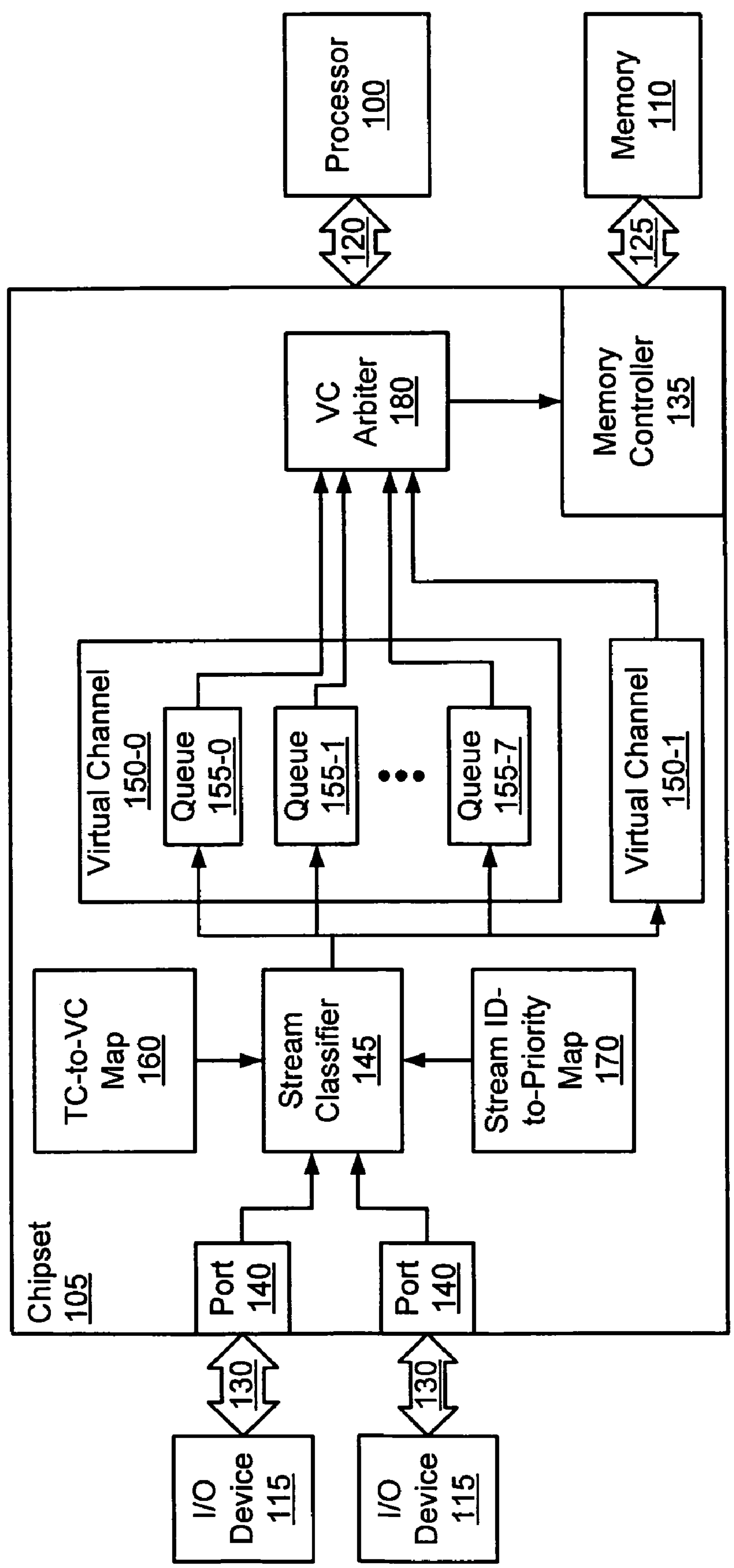
FIG. 1 illustrates an embodiment of a computer system.

Referring to FIG. 1, an embodiment of a computer system is shown. The computer system may include one or more processors 100, a chipset 105, a memory 110, and one or more I/O devices 115. As shown, a processor bus 120 may couple the processors 100 with the chipset 105. Similarly, a memory bus 125 may couple the memory 110 with the chipset 105 and one or more I/O buses 130 may couple the I/O devices 115 with the chipset 105.

The processors 100 may execute software routines stored in the memory 110. In particular, the processor 100 in one embodiment may configure the transfer of data between the I/O devices 115 and the memory 110. Further, the processor 100 may define a traffic class (TC) to virtual channel (VC) map and a stream identifier (ID) to priority map that define how the chipset 105 processes transactions of the I/O device 115.

The chipset 105 may comprise one or more integrated circuits or chips to couple the processors 100 with other components of the computer system. The chipset 104 may comprise a memory controller 135 to read from and/or write data to the memory 110 in response to read and write transactions of the processor 102 and/or the I/O devices 115. As will be explained in detail below, the chipset 105 may prioritize transactions of the devices 115 and may process transactions in an order other than the order in which the transactions were received.

The memory 110 may comprise one or more memory devices that provide addressable storage locations from which data may be read and/or to which data may be written. The memory 110 may also comprise one or more different types of memory devices such as, for example, DRAM (Dynamic Random Access Memory) devices, SDRAM (Synchronous DRAM) devices, DDR (Double Data Rate) SDRAM devices, or other volatile and/or non-volatile memory devices.

The I/O devices 115 may provide various input/output functions for the computer system. For example, the I/O devices 115 may comprise network adaptors, hard disk drives, keyboards, mice, CD (compact disc) drives, DVD (digital video disc) drives, printers, scanners, etc. Further, the I/O devices 115 may be coupled to the chipset 105 via one or more I/O buses 130. In one embodiment, the I/O devices 115 may comprise PCI (Peripheral Component Interconnect) Express components and the buses 130 may comprise PCI Express point-to-point serial links that operate in a manner based upon the PCI Express Base Specification Revision 1.0 of Jul. 22, 2002 (hereinafter "PCI Express Spec"). However, the I/O devices 115 and the I/O buses 130 in other embodiments may operate in accordance with other interconnect technologies such as PCI, USB (Universal Serial Bus), SATA (Serial Advanced Technology Attachment), etc.

Figure 2:
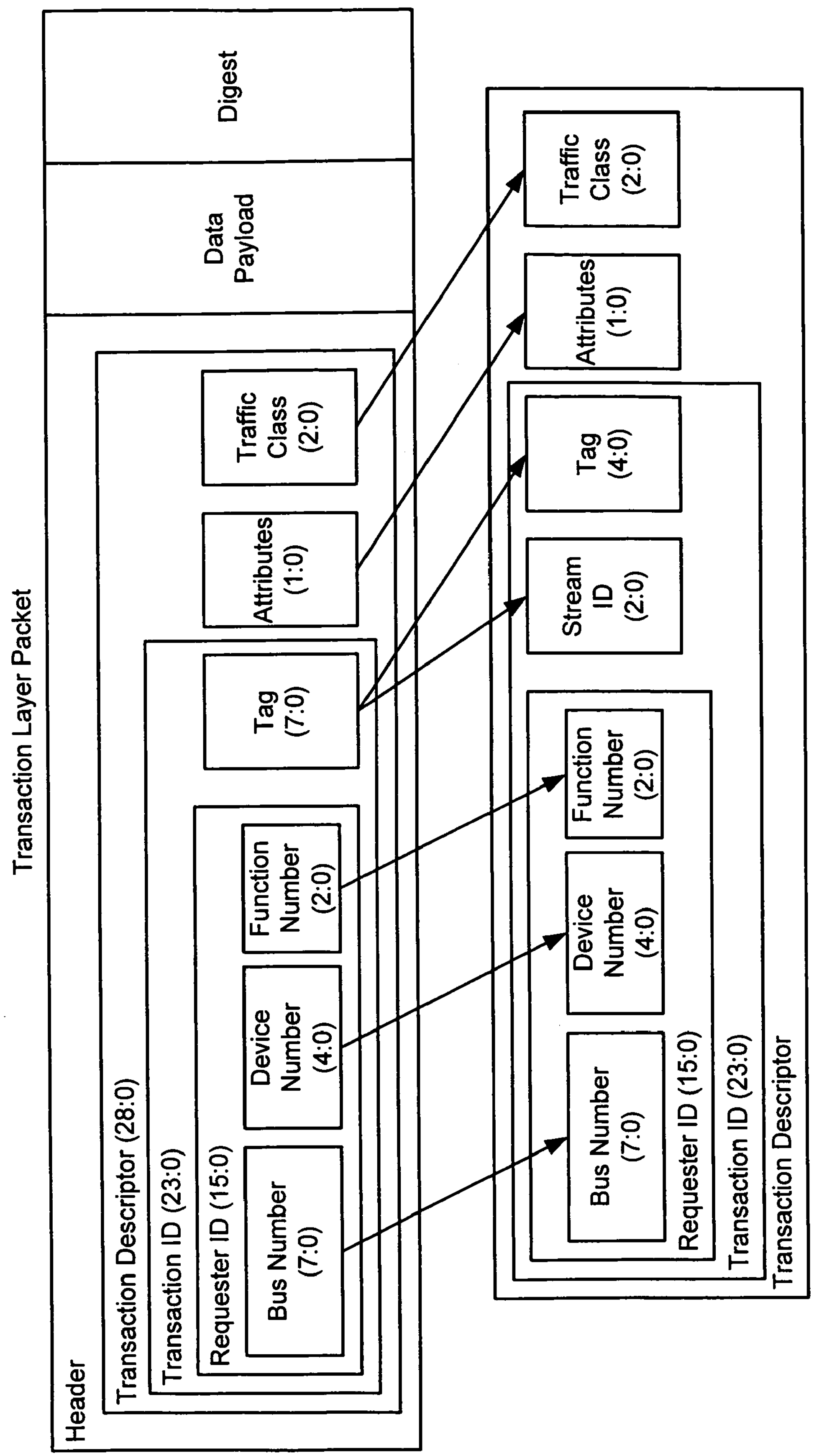
FIG. 2 illustrates an embodiment of a transaction descriptor wherein bits of a tag field are repurposed for a stream identifier (ID) field.
Figure 3:
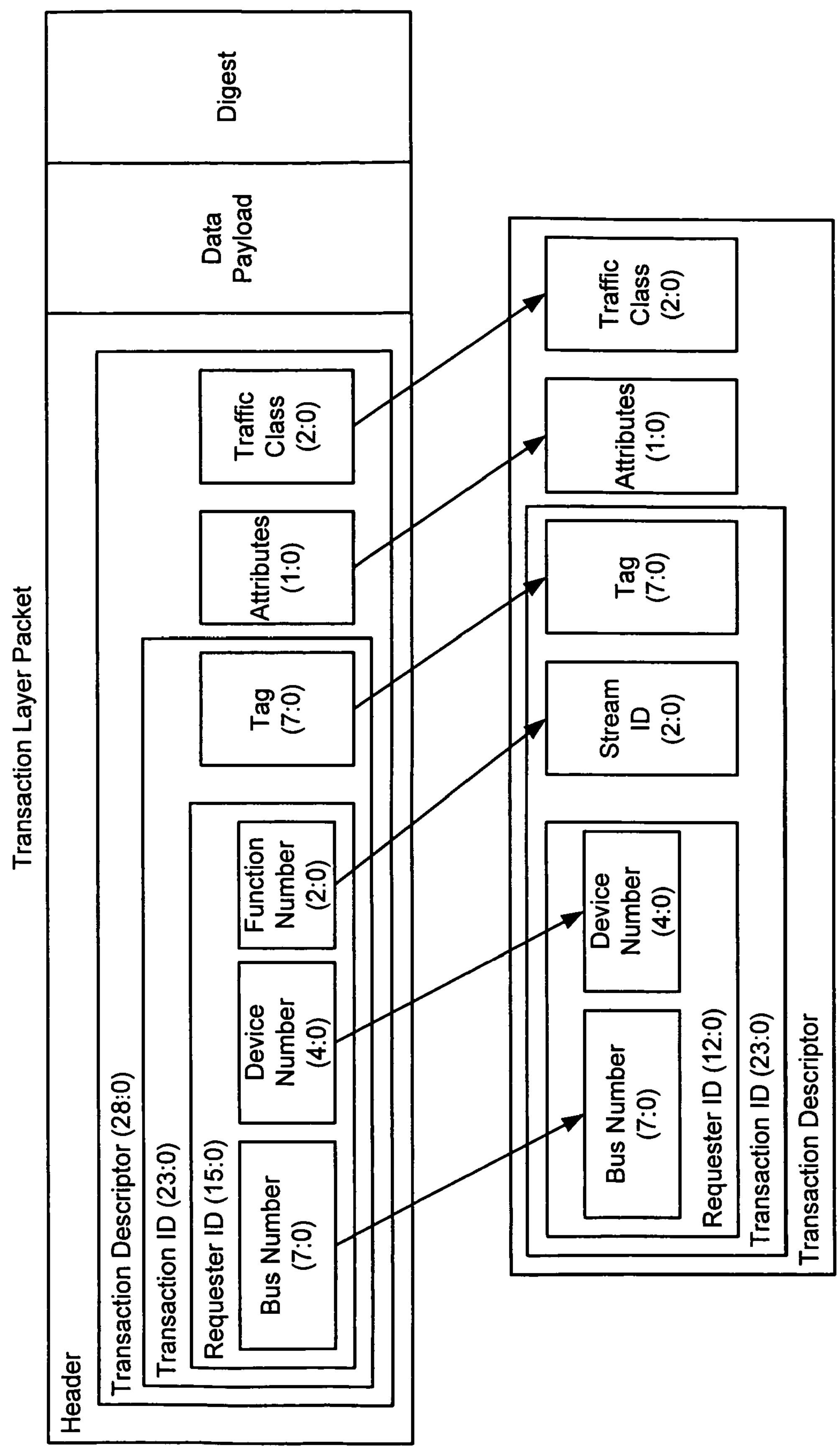
FIG. 3 illustrates an embodiment of a transaction descriptor wherein bits of a function number field are repurposed for a stream ID field.
Figure 4:
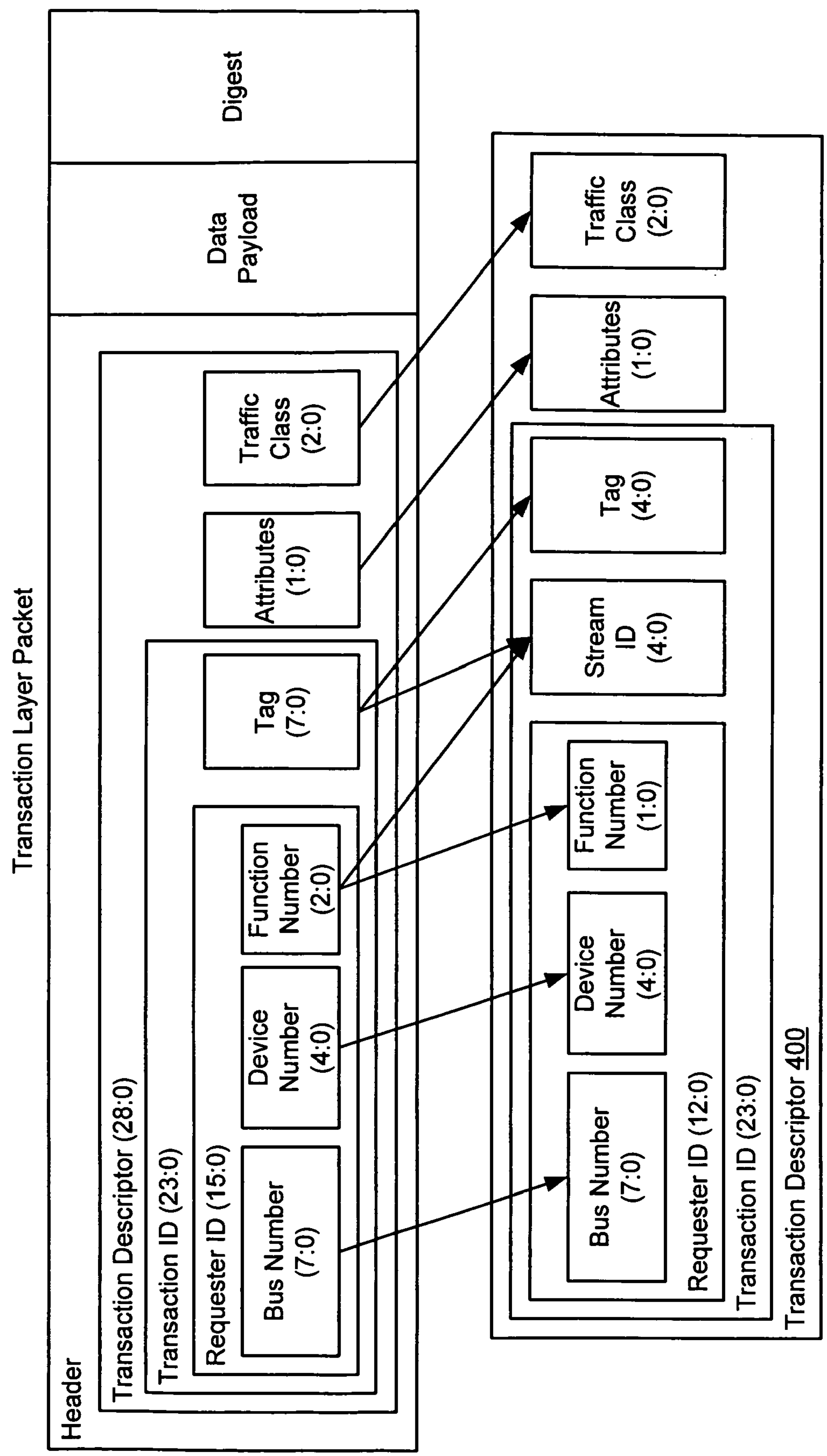
FIG. 4 illustrates another embodiment of a transaction descriptor wherein bits of a tag field and a function number field are repurposed for a stream ID field.

In one embodiment, the I/O devices 130 may generate PCI transaction layer packets that comprise a transaction layer packet (TLP) header, a data payload, and a transaction layer packet (TLP) digest as depicted in FIGS. 2-4. The header may provide various information about the nature of the packet. For example, the header may indicate a packet format, a packet type, a data length, a transaction descriptor, address/routing information, byte enables, a message encoding, and a completion status. In particular, the transaction descriptor may comprise a transaction identified (ID) field, an attributes field and a traffic class field.

The transaction ID field may uniquely identify outstanding transactions. To this end, the transaction ID field in one embodiment may comprise a requester identifier (ID) field and a tag field. The requester ID field may uniquely identify a requester or originator of a transaction, and the tag field may uniquely identify outstanding transactions of a requester that require a completion transaction. In a PCI Express embodiment, the requester ID field comprises a 16-bit value that is unique for each PCI Express function within a PCI Express hierarchy. As depicted, the requester ID field in one embodiment may comprise a bus number field, a device number field, and a function number field.

In a PCI Express embodiment, transactions may originate from a hierarchy of PCI Express functions. In particular, the hierarchy may comprise one or more buses. One or more devices may be coupled to each bus, and each device may comprise one or more functions or requesters. Accordingly, the requester ID field may comprise a bus number field to uniquely identify to which bus a requestor is coupled, a device number field to uniquely identify on which device of the identified bus the requester resides, and a function number field to uniquely identify which function of the identified device is the requester. In particular, the PCI Express Spec defines a 16-bit requester ID field comprising an 8-bit bus number field, a 5-bit device number field, and a 3-bit function number field.

As indicated above, the tag field may uniquely identify outstanding transactions of a requester that require a completion transaction. In one embodiment, a requester generates a tag for each transaction such that the tag is unique for all outstanding transactions that require a completion transaction. In one embodiment, the requester may reuse a tag value for transactions that don't require a completion transaction such as, for example, a posted memory write. The requester may also reuse a tag value after a corresponding transaction completes and is no longer outstanding.

The PCI Express Spec defines an 8-bit tag field. However, the PCI Express Spec indicates that by default that a requestor is limited to 32 outstanding transactions thus using only the lower 5 bits of the tag field to uniquely tag outstanding transaction. The PCI Express Spec further indicates that an extended tag field bit may be enabled to allow the requester to use the full 8 bits of the tag field and therefore enable tagging of up to 256 outstanding transactions. Furthermore, the PCI Express Spec indicates that phantom function numbers may be used to further extend the number of outstanding requests. Basically, an I/O device 115 may assign more than one function number to a single function, thereby allowing the function to have more than 256 outstanding transaction. However, in such a case, the combination of the phantom function number and the tag must be unique for all outstanding transaction that require a completion.

The attributes field may provide additional information about a transaction. In one embodiment, the attributes field may indicate whether the transaction may be handled with relaxed ordering rules. Further, the attributes field in one embodiment may indicate whether the transaction requires hardware enforced cache coherency mechanisms such as snoop transactions.

The traffic class field may enable a requester to place transactions into different traffic classes to differentiate handling of certain transactions. In one embodiment, the transaction descriptor comprises a 3-bit traffic class field that enables a requester to place transactions into 1 of 8 different traffic classes.

Referring back to FIG. 1, the chipset 105 may comprise one or more ports 140 and a transaction classifier 145. The ports 140 may provide a physical interface for sending and receiving transactions to and from the I/O devices 115. The transaction classifier 145 may classify transactions based upon a traffic class and a stream identifier (ID) of a transaction. In particular, the transaction classifier 145 may map transactions to virtual channels 150 and priority queues 155 based upon a traffic class to virtual channel (TC-to-VC) map 160 and a stream ID-to-priority map 170.

The TC-to-VC map 160 may map traffic classes to virtual channels 150. In one embodiment, the chipset 105 may support 8 different virtual channels 150 thus allowing each of the 8 different traffic classes TC0-TC7 to be mapped to a unique virtual channel 150. However, the TC-to-VC map 160 may map more than one traffic class TC to a virtual channel 150 which allows requesters to label their transactions with any of the 8 traffic classes TC0-TC7 even if the chipset 105 supports fewer than 8 virtual channels 150. For example, the PCI Express Spec requires the chipset 105, in a PCI Express embodiment, provide support for at least one virtual channel VC0 and to hardwire the mapping of traffic class TC0 to virtual channel VC0. Thus, in an embodiment having a single virtual channel VC0, the TC-to-VC map 160 may map the other traffic classes TC1-TC7 to the sole virtual channel VC0.

In general, the virtual channels 150 may enable a single communication link or I/O bus 130 to appear as having multiple independent communication channels. In particular, the chipset 105 may comprise separate buffers and flow control mechanisms for each virtual channel 150 thus allowing transactions to continue on one virtual channel 150 of a link even though transactions of other virtual channels 150 are stalled or waiting for completion of other transactions. Furthermore, the virtual channels 150 provide a mechanism to differentiate between transactions. In particular, the chipset 105 may give transactions of one virtual channel 150 higher priority than transactions of another channel 150. To this end, the chipset 105 may further comprise a virtual channel arbiter 180 to arbitrate between the virtual channels 150. The virtual channel arbiter 180 may use various arbitration policies such as a strict priority policy, a round robin policy, a weighted round robin policy, etc. to select a transaction from the virtual channels 150 for processing.

One issue in regard to virtual channels 150 is that virtual channels 150 are costly to implement due to each virtual channel 150 needing its own buffers and flow control resources so that the virtual channels 150 may proceed independently of one another. Accordingly, the chipset 105 may further support differentiating between transactions based upon a stream ID. Basically, an I/O device 115 may label or tag transactions with different stream IDs in order to give different priorities to different types of transactions. The transaction classifier 145 may then assign priorities to the transactions based upon the stream ID-to-priority map 170 and the stream ID of the transaction.

In one embodiment, the chipset 105 may comprise one or more registers that identify where in the memory 110 the stream ID-to-priority map 170 is stored. In another embodiment, the chipset 105 may internally store the stream ID-to-priority map 170 in one or more registers of the chipset. The stream ID-to-priority map 170 in one embodiment may correlate a stream ID with a priority level. In another embodiment, the stream ID-to-priority map 170 may further enable separate stream ID to priority level mappings for each requester ID.

In one embodiment, the transaction classifier 145 may store transactions in separate priority queues 155 of a virtual channel 150 based upon the identified priority for the stream ID of the transaction. For example, in one embodiment, the chipset 105 may support eight stream IDs and eight separate priority queues 155-0, 155-1 . . . 150-7 that run from low priority to high priority respectively. Furthermore, the stream ID-to-priority map 170 may directly map stream IDs to queues such that a stream ID of 0 maps to queue 155-0, a stream ID of 1 maps to queue 155-1, and so on. In such and embodiment, an I/O device 115 may give a transaction a stream ID of 0 in order to assign the transaction the lowest priority and may give another transaction a stream ID of 7 in order to assign the transactions the highest priority.

The chipset 105 may support one or more predefined stream ID-to-priority mappings such as the above direct mapping. One of the predefined mappings may be enabled by default. Furthermore, one of the predefined mappings may be selected by updating one or more bits of a register. Such predefined mappings may greatly reduce the storage requirements for a particular implementation of the stream ID-to-priority map 170.

In one embodiment, each virtual channel 150 may comprise a separate physical queue for each priority level supported by the chipset 105 and the stream ID-to-priority map 170. In another embodiment, each virtual channel 150 may logically comprise a separate logical queue for each priority level supported by the chipset 105 and the stream ID-to-priority map 170. In particular, each virtual channel 150 may comprise a single buffer in which all transactions of the virtual channel 150 are stored. The stream ID-to-priority map 170 may then tag each transaction with its priority level when storing the transaction in the virtual channel buffer. The virtual channel arbiter 180 may then select transactions from the virtual channels 150-0, 150-1 based upon the priorities of the stored transactions as well as the priorities of the virtual channels 150-0, 150-1.

At any rate, prioritizing transactions of a virtual channel 150 may enable higher priority transactions of a virtual channel 150 to essentially pass earlier lower priority transactions. It should be appreciated that tagging transactions with stream IDs may achieve some of the benefits associated with virtual channels 150. In particular, tagging transactions with stream IDs may enable higher priority transactions to complete before earlier lower priority transactions and may prevent lower priority transactions from stalling higher priority transactions. However, in general the stream IDs may be implemented in a less costly manner than traffic classes since stream IDs do not require multiple virtual channels 150 in order to distinguish between transactions of different priorities.

Referring now to FIGS. 2-4, transaction ID field embodiments for implemented stream IDs within a PCI Express transaction descriptor are shown. For example, FIG. 2 illustrates that one or more bits of the tag field may be repurposed as a stream ID field. As indicated above, only the lower 5 bits of the 8-bit tag field in a PCI Express requester ID field are used for uniquely tagging outstanding transactions of the requester. As a result, in one embodiment, the chipset 105 and the I/O devices 115 utilize the unused upper 3 bits of the tag field for a 3-bit stream ID. Accordingly, in such an embodiment, an I/O device 115 may assign its outstanding transactions to 1 of 8 different streams or priorities by placing an appropriate stream ID in the upper 3 bits of the tag field.

Another transaction descriptor embodiment is illustrated in FIG. 3 wherein one or more bits of the function number field are repurposed for a stream ID field. Some PCI devices are single function devices. For such devices, the bits of the function number field essentially go unused since the function number does not change for these single function devices. As a result, in one embodiment, the chipset 105 and the I/O devices 115 may utilize the unused function number field for a stream ID field.

Yet another transaction descriptor embodiment is illustrated in FIG. 4 wherein one or more bits of the function number field and the tag field are repurposed for a stream ID field. Some PCI devices have less than five functions. As a result, the highest order bit of the 3-bit function number field essentially goes unused for these I/O devices 115 with fewer than 5 functions. Therefore, in one embodiment, the chipset 105 and the I/O devices 115 may utilize the unused upper three bits of the tag field and the upper bit of the function number field for a stream ID field. In such an embodiment, an I/O device 115 may assign its outstanding transactions to one of 16 different streams or priorities by placing an appropriate stream ID in a 4-bit stream ID field that comprises the upper bit of the function number field and the upper 3 bits of the tag field.

In one embodiment, the chipset 105 and I/O devices 115 are hardwired to use one of the above transaction descriptors depicted in FIGS. 2-4 or some other stream ID transaction header. In another embodiment, the chipset 105 and the I/O devices 115 may be programmed to use on of the above transaction descriptors depicted in FIGS. 2-4 or some other stream ID transaction header. In yet another embodiment, the transaction layer packet header may include one or more bits that identify the format of the transaction descriptor thus enabling the chipset 105 and I/O devices 115 to dynamically select a suitable transaction descriptor format.

Figure 5:
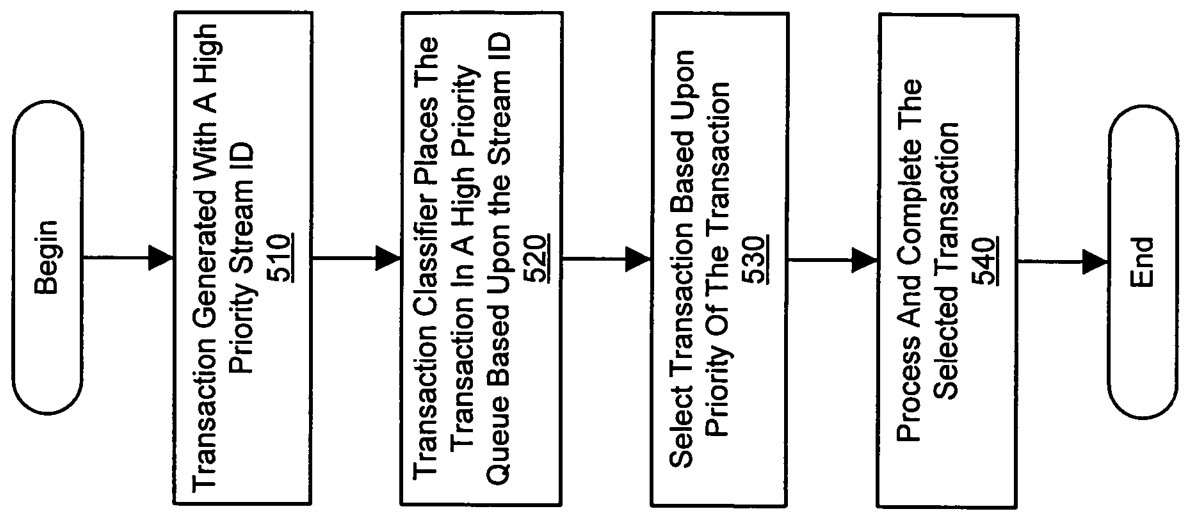
FIG. 5 illustrates a flow for handling a high priority memory transaction.

Reference is now made to FIG. 5 which depicts the flow of a high priority transaction to illustrate the process for handling prioritized streams. In block 500, an I/O device 115 may generate a memory read transaction with a high priority stream ID in the stream ID field and a general purpose traffic class. The I/O device 115 may elect to generate the memory read transaction with a high priority stream ID due to the I/O device 115 determining that the memory read transaction should be processed quickly in order to achieve desired performance levels. For example, the I/O device 115 may assign isochronous transactions such as memory read transactions associated with audio and/or video streams a high priority in order to reduce the odds of encountering a playback glitch. In another example, the I/O device 115 may assign a memory read transaction of a TCP/IP offload engine that is crucial to network performance a high priority in order to improve the latency of the memory read transaction and the performance of the network.

In response to receiving the memory read transaction, the transaction classifier 145 in block 510 may classify the memory read transaction based upon its stream ID field and its traffic class field. In particular, the transaction classifier 145 may determine to place the memory read transaction in the general purpose virtual channel 150-0 based upon the traffic class of the memory read transaction and the TC-to-VC map 160. Furthermore, the transaction classifier 145 may determine to place the memory read transaction in the highest priority queue 155-8 of the chosen virtual channel 150-0 based upon the stream ID of the transaction and the stream ID-to-priority map 170.

In block 530, the arbiter 180 may select the memory read transaction from the virtual channels 150-0, 150-1 based upon priorities of the virtual channels and their respective queues 155. In particular, the arbiter 180 may select the memory read transaction ahead of earlier received lower priority transactions of the virtual channel 150-0. Finally, the memory controller 135 in block 540 may process the memory read transaction and cause a completion transaction with the requested data to be returned to the I/O device 115.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method comprising receiving a transaction comprising a stream identifier, identifying the priority of the transaction based upon a map, wherein the map identifies a priority corresponding to the stream identifier, storing the transaction in a queue of a plurality of queues that is associated with the priority, wherein each of the plurality of queues corresponds to a priority value, and processing the transaction based upon a priority associated with the stream identifier.

2. The method of claim 1 further comprising identifying a virtual channel of a plurality of virtual channels for the transaction based upon a traffic class of the transaction, and storing the transaction in a buffer of the virtual channel.

3. The method of claim 1 further comprising processing the transaction ahead of an earlier received transaction based upon the priority of the transaction and a priority of the earlier received transaction.

4. The method of claim 1 further comprising obtaining the stream identifier from a tag field of the transaction.

5. The method of claim 1 further comprising obtaining the stream identifier from a function number field of the transaction.

6. The method of claim 1 further comprising obtaining the stream identifier from a tag field and a function number field of the transaction.

7. The method of claim 1, wherein the queue is coupled between a first logic that causes storage of the transaction in the queue and a second logic that causes processing of the transaction.

8. An apparatus comprising a transaction classifier to assign priorities to a plurality of transactions based upon stream identifiers included with the plurality of transactions and cause storage of each of the plurality of transactions in a respective storage device of a plurality of storage devices, wherein each of the plurality of storage devices corresponds to a priority value, and an arbiter to select transactions for processing from the storage device based upon priorities assigned to the transactions.

9. The apparatus of claim 8 wherein the transaction classifier further assigns priorities to the plurality of transactions based upon a stream identifier to the priority map.

10. The apparatus of claim 8 further comprising at least one register to define a stream identifier to priority map, wherein the transaction classifier further assigns priorities to the plurality of transactions based upon the stream identifier to the priority map.

11. The apparatus of claim 8 further comprising a plurality of virtual channels, wherein the transaction classifier further assigns each transaction of the plurality of transactions to a virtual channel of the plurality of virtual channels based upon a traffic class of each transaction.

12. The apparatus of claim 8 further comprising a plurality of virtual channels, wherein the transaction classifier further assigns each transaction of the plurality of transactions to a virtual channel of the plurality of virtual channels based upon a traffic class of each transaction and a traffic class to virtual channel map.

13. The apparatus of claim 8 further comprising a plurality of virtual channels, wherein the transaction classifier further assigns each transaction of the plurality of transactions to a virtual channel of the plurality of virtual channels, and the arbiter further selects transaction for processing based upon priorities assigned to the virtual channel.

14. The apparatus of claim 8 wherein the arbiter select higher priority transaction ahead of an earlier received lower priority transactions.

15. The apparatus of claim 8, wherein the storage device is coupled between the transaction classifier and the arbiter.

16. The apparatus of claim 8, wherein each of the plurality of storage devices corresponds to a different priority value.

17. A system comprising a processor, an I/O device to generate a memory transaction, a memory to store instruction for the processor and data for the I/O device, and a chipset comprising:

a first logic to assign a priority to the memory transaction based upon: (a) a stream identifier included with the memory transaction; and (b) a priority map corresponding to the stream identifier; and a second logic to process the memory transaction based upon the assigned priority, wherein a queue that is to store the transaction is selected from a plurality of queues and wherein each of the plurality of queues corresponds to a priority value.

18. The system of claim 17 wherein the chipset further assigns the memory transaction to a virtual channel based upon a traffic class of the memory transaction.

19. The system of claim 17 wherein the chipset further assigns the memory transaction to a virtual channel of a plurality of virtual channels based upon a traffic class of the memory transaction and a traffic class to virtual channel map.

20. The system of claim 17 wherein the chipset further assigns the memory transaction to a virtual channel based upon a traffic class of the memory transaction, and processes the memory transaction based upon a priority assigned to the virtual channel.

21. The system of claim 17 wherein the chipset process the memory transaction ahead of an earlier received memory transaction based upon the priority of the memory transaction and a priority of the earlier received memory transaction.

22. The system of claim 17, wherein a queue that is to store the transaction is coupled between the first logic and the second logic.

* * * * *